Nov. 26, 1929.  A. S. MACDONALD  1,736,883
BOOKSTACK
Filed Sept. 30, 1927  7 Sheets-Sheet 1

Fig. 1.

INVENTOR
Angus S. Macdonald
BY
Synnestvedt & Lechner
ATTORNEYS

Nov. 26, 1929.  A. S. MACDONALD  1,736,883
BOOKSTACK
Filed Sept. 30, 1927  7 Sheets-Sheet 2

INVENTOR
Angus S. Macdonald
BY
Synnestvedt & Lechner
ATTORNEYS

Nov. 26, 1929.   A. S. MACDONALD   1,736,883
BOOKSTACK
Filed Sept. 30, 1927   7 Sheets-Sheet 3

INVENTOR
Angus S. Macdonald
BY
Synnestvedt & Lechner
ATTORNEYS

Nov. 26, 1929.  A. S. MACDONALD  1,736,883
BOOKSTACK
Filed Sept. 30, 1927   7 Sheets-Sheet 7

INVENTOR
Angus S. Macdonald
BY
Synnestvedt & Lechner
ATTORNEYS

Patented Nov. 26, 1929

1,736,883

UNITED STATES PATENT OFFICE

ANGUS S. MACDONALD, OF GREAT NECK, NEW YORK, ASSIGNOR TO SNEAD & COMPANY, OF JERSEY CITY, NEW JERSEY, A CORPORATION OF NEW JERSEY

BOOKSTACK

Application filed September 30, 1927. Serial No. 222,956.

This invention relates to book stacks for libraries.

The bookstack contemplated is primarily intended for use in connection with library buildings in which certain structural work of the building cooperates with certain parts of the stack to form a plurality of stack ranges each consisting of a plurality of tiers of stacks. In such buildings it is desirable to have the book ranges uniformly spaced and to have the tiers arranged one over the other so that structural columns which cooperate with the book stacks may extend continuously throughout the height of the building. It is also desirable to have the ranges as close together as possible, without leaving aisles which are uncomfortably narrow, so that the available floor space may be used to best advantage. Difficulties have been encountered heretofore in this respect, owing to the variance in widths of books, some being relatively wide and others relatively narrow.

In order to maintain uniform spacing of the columns throughout it has been the practice heretofore in many instances to employ stacks having shelves of a width to accommodate the widest books throughout the book room, the columns being spaced sufficiently apart to leave comfortable aisles between the stacks. As there are a large number of books, however, that do not require wide shelves, it will be seen that the above arrangement is wasteful of space. On the other hand, let us assume that the columns are so spaced as to leave comfortable aisles between stacks having wide shelves and that this spacing is maintained throughout and that other stacks are provided which have narrower shelves, then it will be seen that the aisles between the latter stacks would be wider than necessary. In a library of any appreciable size the aggregate of the unnecessary aisle space of such aisles would be great enough to accommodate extra bookstacks. It is also pointed out that if stacks having wide shelves are employed throughout, difficulties are encountered in keeping the books lined up and a portion of the shelves is left exposed to dust.

I aim to overcome the above and other disadvantages hereinafter appearing, by providing a bookstack which may be readily adjusted as to width which enables me to hold down the number of ranges having wide shelves and to arrange them with respect to other ranges having narrower shelves so as to give comfortable aisles with relatively close and uniform spacing of the columns. Another advantage of my invention resides in the simple manner in which the stacks can be adjusted to properly accommodate various sizes of books, this being particularly advantageous when it is considered that it is desirable from time to time to rearrange the books, for example, when a change in library administration takes place.

It is therefore an object of my invention to provide a bookstack having the above characteristics.

A more specific object of my invention is the provision of a bookstack of simple construction which may be adjusted to accommodate various widths of shelves with the same unit parts.

Another object of my invention is to provide a bookstack in which the tendency to sidewise bending is minimized.

A further object is to mount the stacks in a manner so that each tier of stacks may be erected irrespective of any other tier.

Other objects reside in the provision of certain curb means, kick plates and bottom shelving for purposes hereinafter appearing.

How the foregoing together with such other objects and advantages as may hereinafter appear, or are incident to my invention are realized, is illustrated in preferred form in the accompanying drawings, wherein

Fig. 4 is an enlarged fragmentary sectional view illustrating certain details of my invention, the section being taken substantially on the line 4—4 of Fig. 5;

Fig. 5 is a fragmentary section taken on the line 5—5 of Fig. 4;

Fig. 6 is a fragmentary plan section taken on the line 6—6 of Fig. 4;

Fig. 11 is a plan section of a modified arrangement in which sheet metal parts are employed substantially throughout the stack;

Fig. 12 is a fragmentary sectional elevation taken on the line 12—12 of Fig. 11, and Figs. 13 and 14 are enlarged sectional views of certain details employed in the modified form of my invention illustrated in Figs. 11 and 12, the views, respectively, being taken on the lines 13—13 and 14—14 of Fig. 12.

Figure 1:
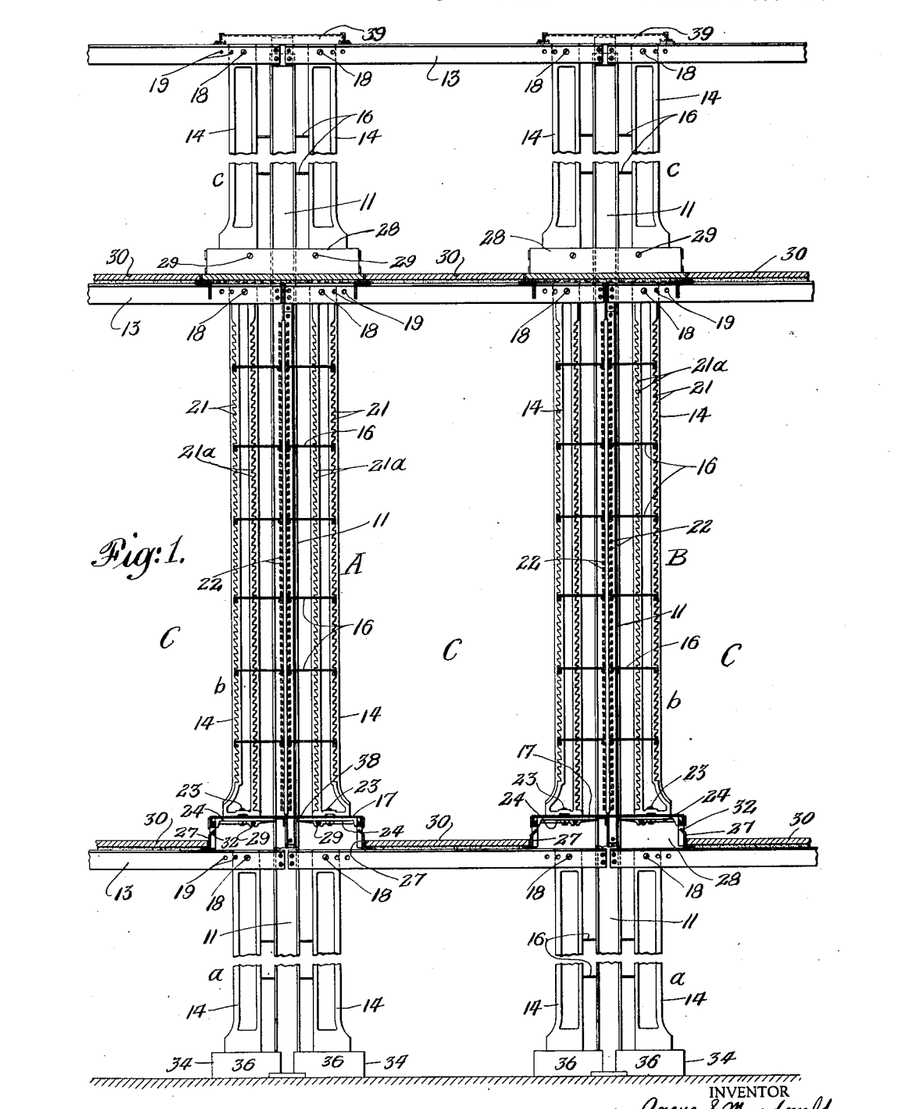
Fig. 1 is an end view illustrating two ranges of bookstacks of three tiers each constructed and arranged in accordance with my invention, the middle tier appearing in section and the upper and lower tiers appearing in elevation and partly broken out to condense the figure.
Figure 2:
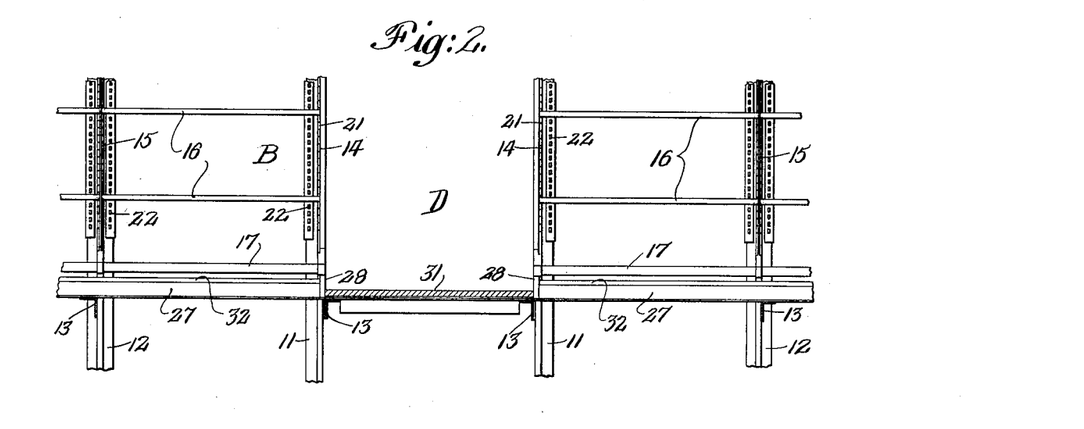
Fig. 2 is a fragmentary more or less diagrammatic longitudinal section thru the lower end portions of a pair of stacks and illustrating a cross aisle.
Figure 3:
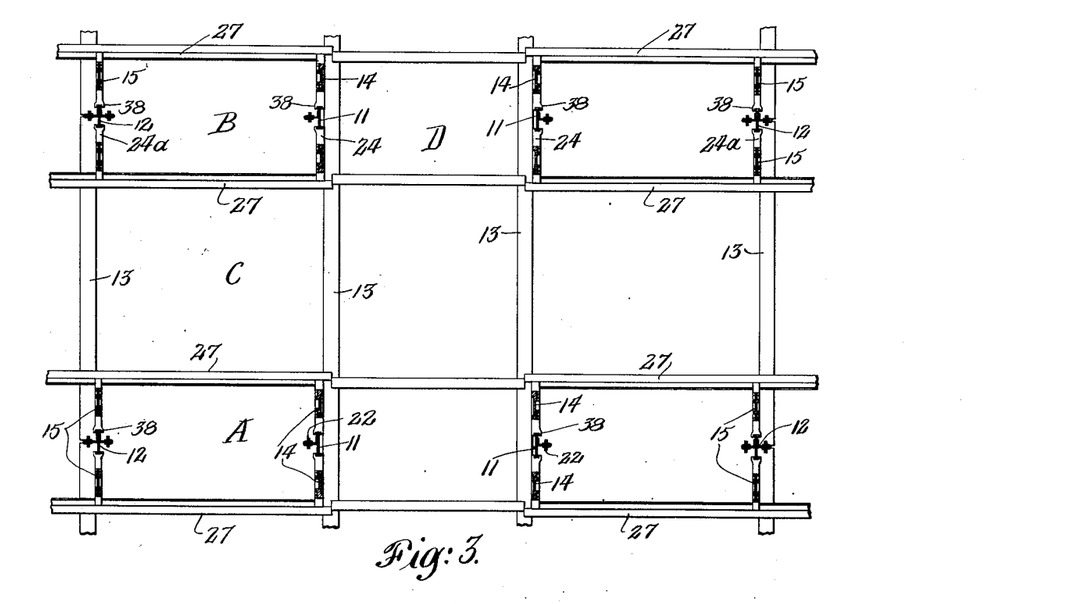
Fig. 3 is a diagrammatic sectional plan view illustrating certain structural building members with certain bookstack parts shown in place.

Referring to the drawings and particularly to Figs. 1, 2 and 3, it will be seen that I have illustrated two ranges of bookstacks A and B, each comprising three tiers of stacks a, b, and c, the ranges being associated with structural columns 11 and 12 of a library building and the tiers of stacks being associated with horizontal structural members 13 of the building.

Each tier comprises a plurality of bookstack units which are of similar construction with the exception of certain details as will hereinafter appear.

Referring now more particularly to the tier of bookstacks b, it is pointed out that the bookstacks comprise in general end shelf supporting members 14 of which there is a pair at each end of the stack, intermediate shelf supporting members 15 arranged in pairs and located between the end members 14, a plurality of readily removable shelves 16, and bottom fixed shelves 17.

The shelf supporting members 14 and 15 are suspended or hung from the horizontal structural members 13 by means of bolts 18 or other suitable means, the members 13 being provided with a plurality of spaced holes 19 for receiving the bolts and the members 14 and 15 being provided with elongated holes 20, the specific purpose of which will hereinafter appear. It is pointed out that the members 14 and 15 are of such length with respect to the distance between floor or deck levels so that their lower ends are free of the floor in consequence of which the bookstack is supported entirely from above.

The shelf supporting members 14 and 15 are provided with a plurality of notches 21 and 21$^a$ adjacent opposite edges thereof adapted to be engaged by the shelves 16 for supporting them at their outer ends. The inner ends of these shelves are supported as by means of hooks 22 provided on the upright columns 11 and 12. These shelves merely rest on the hooks and notches and may therefore be readily removed and readjusted as to vertical spacing. In addition to the shelves 16 a bottom shelf 17 is provided, which shelf is detachably secured to the members 14 and 15 at their free ends as by means of the bolts 23. The bottom shelves in this instance are formed of sheet metal plates having reinforced longitudinal edges and are stiffened at the shelf supports by means of the members 24, 24$^a$ between which and the bottom ends of the shelf supporting members the shelves are clamped. Elongated holes 25 and 26 are provided in the shelf supporting members and the stiffening members respectively for receiving the bolts as clearly illustrated in Figs. 4, 5 and 6.

Referring to Figs. 5 and 6 the manner in which the shelves 17 are stiffened at their ends by the members 24 is clearly illustrated. In connection with the intermediate members 24$^a$, it will be understood that these members 24$^a$ stiffen the ends of two adjacent shelf sections.

In the arrangement illustrated in Figs. 1 to 6 inclusive, it will be noted that the shelf supporting members are suspended through the medium of the innermost holes of the plurality of holes 19 which gives a spacing between the members suitable for the accommodation of the narrowest shelves to be employed in this particular instance. With the shelf supporting members adjusted for this size of shelf the bolts 23 pass through the inner of the holes 26 in the stiffening members 24. The next width of shelves may be accommodated by adjusting the supporting members to a wider spacing, in which case the bolts 18 are placed in the intermediate holes of the holes 19 and the bolts 23 in the outer of the holes 26 in the stiffening members. It is to be observed that in the two adjustments just described the shelves are supported at the outer end by the outer row of notches 21.

Figure 10:
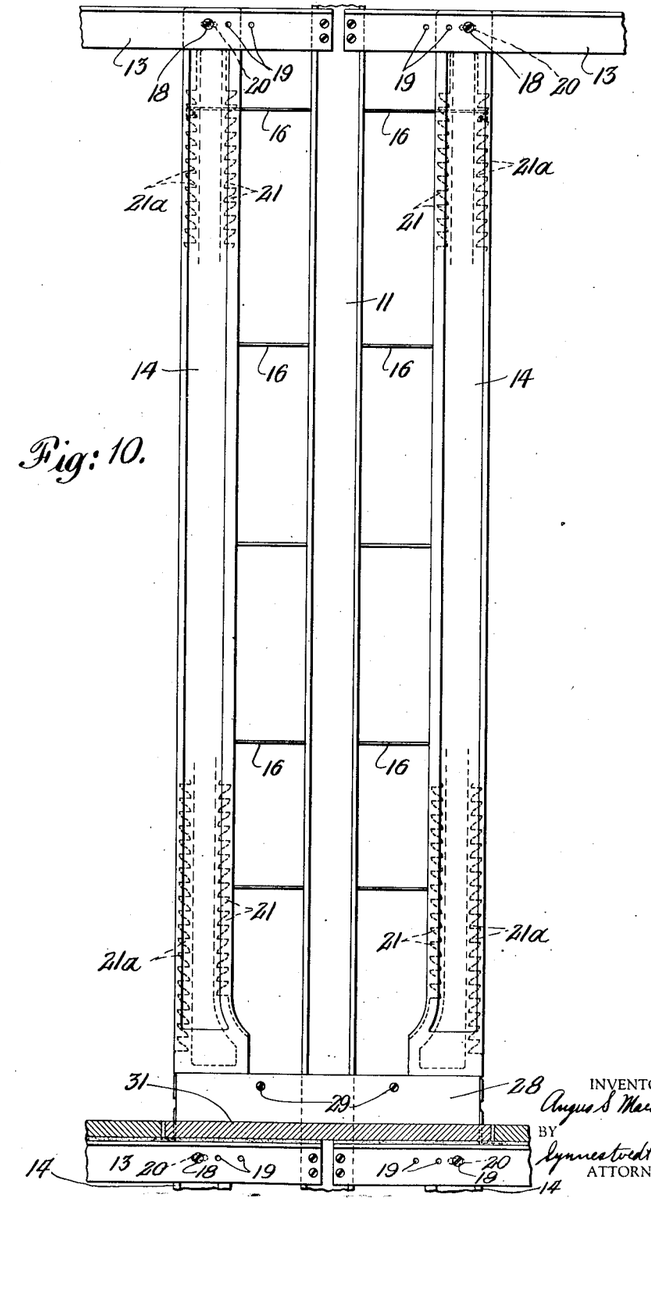
Fig. 10 is an enlarged end view of a bookstack showing a different arrangement of the bookstack parts.

In Fig. 10 I have illustrated the arrangement of the parts when the bookstack is adjusted to accommodate the widest shelves to be employed in this particular instance. It will be noted that with the parts in this adjustment the shelf supporting members have been rearranged, that is, the left hand members of Fig. 1 have become the right hand members of Fig. 10, and the right hand members of Fig. 1 have become the left hand members of Fig. 10 and the bolts 18 have been placed in the outermost of the plurality of holes 19. With the parts so arranged the shelves 16 are supported at their outer ends by the sets of notches 21ª which are opposite to the sets of notches 21.

In addition to the above adjustments close adjustment of the shelf supporting members may be had by virtue of the elongation of the holes 20 and 26.

Reverting now to the bottom shelf 17 it will be noted that this shelf corresponds in width to the overall width of the widest shelves 16 which enables me to employ the same bottom shelf with its stiffening members 24, no matter what size of shelves are being used above. In addition to making it possible to use the same unit parts, no matter what the adjustment is, other advantages of employing such a bottom shelf will appear hereinafter.

Referring now to Figs. 1, 4 and 5 it will be seen that the shelf supports at their free ends terminate somewhat above the level of the floor so that a gap is left between the bottom shelves 17 and the floor. In order to close this gap I have provided longitudinally extending curb means 27 comprising what may be termed a "curb angle" and end plates 28 termed for convenience "kick plates". The curb angles are located underneath and in alignment with the reinforced edges of the shelves 17 and are secured to the structural members 13 in any suitable manner.

The end or kick plates 28 are formed of sheet metal having reinforced ends and may be secured to the end stiffening members 24 by means of bolts 29. Suitable flooring 30 supported by the structural members 13 and extending from the curb angle of one stack to the curb angle of the adjacent stack is provided for the longitudinal aisles C and similarly supported flooring 31 extending from the kick plate of one stack to the kick plate of the next aligned stack is provided for the cross aisles D.

In connection with the curb angles 27 it is to be noted that the upper portion thereof slopes inwardly as indicated at 32, thus providing what may be termed a "moping slope" to prevent water from trickling down behind the curb angle. It also affords protection against dropping things down through the gap to the floor below; tends to stiffen the upstanding leg of the curb angle against sidewise deflection; makes it stronger for carrying loads; and makes it impossible to use the curb angle as a shoe scraper.

From the foregoing it will be seen that a convenient space is provided between the bottom fixed shelf 17, structural members 13, curb angles 27 and the upright columns 11 and 12 for passage of electric conduits, vacuum cleaner pipes and the storage of long material such as rolled maps.

Figure 7:
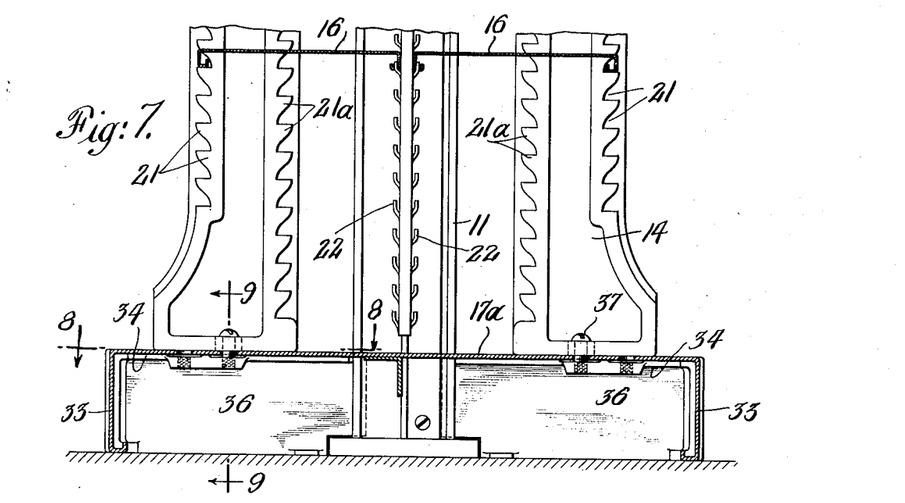
Fig. 7 is an enlarged fragmentary view similar to Fig. 4 but illustrating the arrangement of parts at the bottom tier of a bookstack range.

Referring now to the bottom tier of bookstacks, it will be noted that in all essential respects these stacks are constructed the same as the stacks just described. The bottom shelves and associated parts, however, are of different construction, as will now appear, and as is clearly illustrated in Figs. 7, 8 and 9. In these figures a bottom shelf 17ª of the bottom tier of stacks and its associated parts are illustrated. The shelf in this instance is provided with vertical flanges 33 extending longitudinally of the shelf and of a height to fill the gap between the shelf proper and the ground floor of the library building. The stiffening members 34 and 35 for the shelf in this instance are in the form of stool members extending from the shelf supports to the floor, the end stool members 34 being provided with the plate-like portions 36 constituting, in effect, end kick plates for the book sections of the bottom tier. The stool members 34 and 35 are secured to the shelf supporting members 14 and 15 by means of the screws 37 and the shelves 17ª are clamped between these members.

Figure 8:
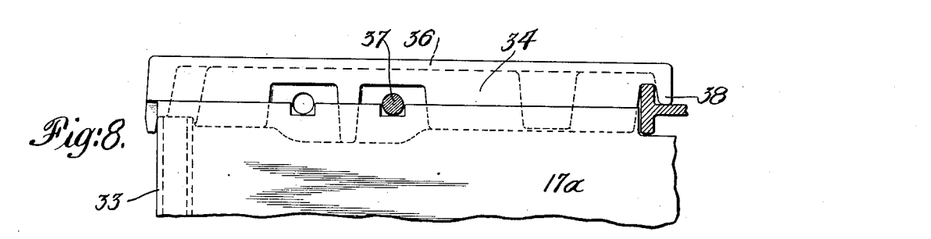
Fig. 8 is a plan section taken on the line 8—8 of Fig. 7.
Figure 9:
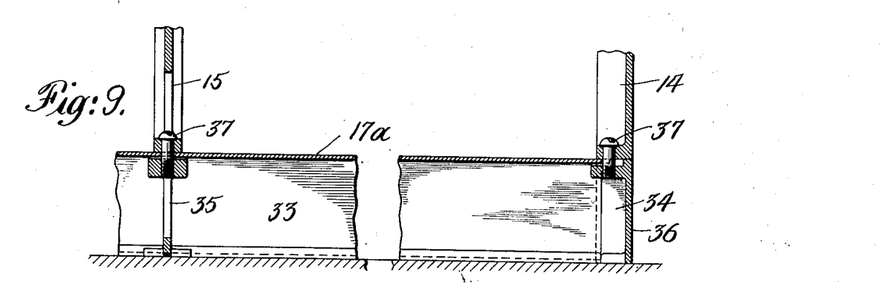
Fig. 9 is a section taken on the line 9—9 of Fig. 7.

It is to be seen that the various stiffening members hereinbefore described are adapted to engage the upright columns as indicated at 39 in Figs. 4, 6 and 8, thus affording lateral support for the shelf supports and preventing swaying of the stack.

A suitable hood 39 (see Fig. 1) is provided above the stacks of the upper tier.

In the modification of my invention illustrated in Figs. 11 to 14, inclusive, I have shown a bookstack which, although having structural members of slightly different characteristics, embodies the main features of my invention.

Figures 12, 13, 14:
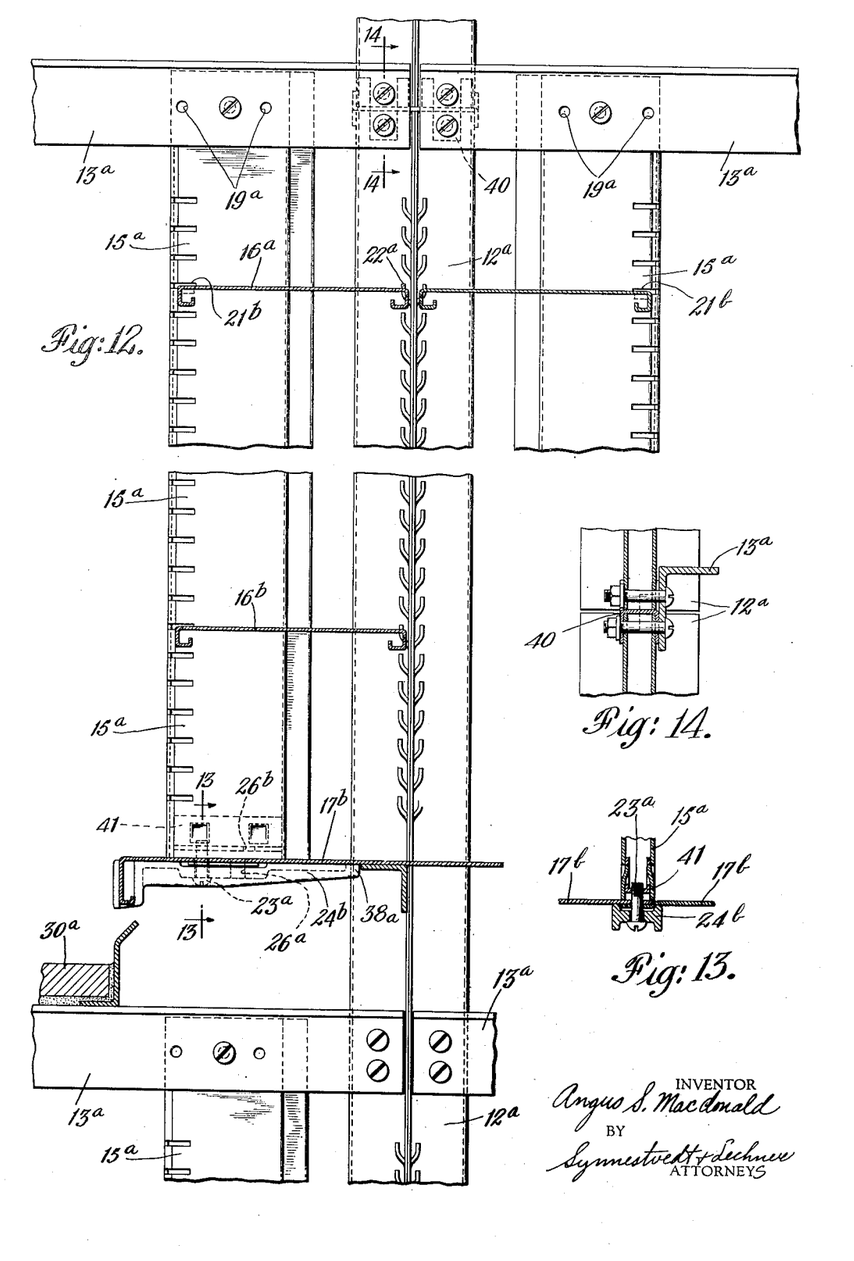

In this form I have constructed the upright structural columns 11ª and 12ª of sheet metal of suitable form, in cross section to ensure rigidity, each column being composed of a plurality of sections spliced together, as by means of the splice clips 40 shown in Figs. 12 and 14. The end shelf supports 14ª and the intermediate shelf supports 15ª are also of sheet metal construction, the cross section of which appears in Fig. 11. Horizontal structural members 13ª similar to the members 13 above described are provided on which the flooring 30ª is supported.

The shelf supports 14ª and 15ª are suspended from these members 13ª in a manner similar to that above described. The shelf supports 14ª and 15ª are provided with a plurality of notches or holes 21ᵇ and the columns 11ª and 12ª are provided with a plurality of hooks 22ª for positioning the adjustable shelves 16ª on the supports. A fixed lower shelf 17ᵇ is secured to the shelf supports at the lower ends thereof by means of the stiffening members 24ᵇ, the screws 23ª, and the clips 41, as clearly illustrated in Figs. 12 and 13. As before, the stiffening members also afford lateral support for the shelf supports by engaging the structural columns at 38ª. The shelf supports may be adjusted to accommodate various widths of shelf by means of the plurality of holes 19ª in the members 13ª, the holes 26ª in the members 24ᵇ and the holes 26ᵇ in the clips 41.

The arrangement of the aisles and curb means is as described in connection with the preferred form of my invention. End plates 42 secured to the shelf supports may be employed to give a neat appearance to the stacks.

Bookstacks constructed in accordance with this modification can be very economically manufactured and are particularly useful in installations where relatively low stacks are required.

Having thus described the various details of my invention and certain advantageous features thereof, I will now go more fully into the advantages to be derived through the practice of the invention by giving as an example certain dimensions of a practical development thereof.

It has been found that under various conditions a center to center spacing of the columns of 52″ averages out the best and that the employment of bookstacks adapted to accommodate 8, 10 and 12 inch books is very desirable. With a spacing of 52″ between centers of ranges the use of 12″ shelves making the ranges themselves a little over 24″ wide, leaves aisles that are uncomfortably narrow. Owing to the fact that it is not generally known where the books requiring 12″ shelves will have to be placed from time to time as the library grows and the classes of books have to be rearranged, it has been the practice in some libraries, as above pointed out, to use 12″ shelves throughout the entire stacks. This, however, is objectionable with the spacing of 52″ on account of leaving narrow aisles. I have found that the provision of bookstacks which can be adjusted to change the width of the ranges so as to accommodate 8, 10 or 12 inch shelves allows the books to be rearranged as desired without moving entire stacks for replacement by others of a different width, the same unit parts being used and appropriate shelving being substituted. In this connection it is pointed out that the cost of manufacture is greatly reduced, by being able to use the same unit parts for various widths of stacks, over the cost in cases where special parts must be provided for each width of stack.

It will be seen that I am enabled to keep the number of stacks having 12″ shelves down to the exact number required, it being a simple matter to adjust more stacks to accommodate 12″ shelves as they are needed. In addition to the advantage of obtaining comfortable aisles by my invention I am enabled to keep the books lined up and to minimize spaces to collect dust by employing shelves of proper widths for the books to be carried thereby.

It is pointed out that I prefer to have the bottom shelves of a fixed width corresponding to the widths of the widest shelves so that the curb angle, kick plates, flooring, etc., need not be changed when making adjustments for different widths.

In connection with the suspension of the bookstacks from the overhead building structure, it is pointed out that this puts the shelf supports in tension whereby they are much less subject to sideways bending than they would be if they were supported from below and under compression. This arrangement also permits each tier of shelf supports between adjacent deck floors to be erected irrespective of any other tier. Also expansion and contraction difficulties are obviated.

I claim:

1. A bookstack comprising in combination shelf supports hung from overhead building structure and free from underfoot building structure, bottom shelving secured to the supports at the lower ends thereof, and a plurality of other shelves supported by said supports, together with means associated with the building structure for supporting the bookstack against swaying.

2. A bookstack comprising in combination with upright and horizontal structural building members, shelf supports suspended from said horizontal members and adjacent said upright members, shelves supported by the upright members and said supports, and a bottom shelf secured to the supports at the bottom thereof.

3. A bookstack comprising in combination with upright and horizontal structural building members, shelf supports suspended from said horizontal members and adjacent said upright members, shelves supported by the upright members and said supports, said supports being adjustable to various positions along the longitudinal members to accommodate various widths of shelves.

4. In combination a plurality of bookstack ranges hung from overhead building structure and free from underfoot building structure, flooring constituting aisles between the ranges and curb means substantially closing the gap between said flooring and the bottom of the bookstacks of said ranges.

5. In combination a plurality of bookstack ranges hung from overhead building structure and free from underfoot building structure, flooring constituting aisles between the ranges and curb means substantially closing the gap between said flooring and the bottom of the bookstacks of said ranges, said curb means including a member having a sloping upper surface.

6. In combination a plurality of bookstack ranges hung from overhead building structure and free from underfoot building structure, said stacks including a pair of spaced shelf supports at each end of the stacks through the medium of which the stacks are suspended, a plurality of shelves, means on said supports engageable by the shelves for supporting them, a bottom shelf, means for securing said bottom shelf to said supports at the free ends thereof including stiffening members, said supports being capable of adjustment with respect to the overhead structure and the bottom shelf to alter the spacing thereof so that shelves of different widths may be accommodated and the bottom shelf being of a width corresponding to the maximum width of shelf to be employed, flooring constituting aisles between the ranges, and curb means substantially closing the gap between said flooring and said bottom shelves.

7. In combination a plurality of bookstack ranges hung from overhead building structure and free from underfoot building structure, said stacks including a pair of spaced shelf supports at each end of the stacks through the medium of which the stacks are suspended, a plurality of shelves, means on said supports engageable by the shelves for supporting them, a bottom shelf, means for securing said bottom shelf to said supports at the free end thereof including stiffening members, said supports being capable of adjustment with respect to the overhead structure and the bottom shelf to alter the spacing thereof so that shelves of different widths may be accommodated and the bottom shelf being of a width corresponding to the maximum width of shelf to be employed, flooring constituting aisles between the ranges, and curb means substantially closing the gap between said flooring and said bottom shelves, together with means at the ends of the stacks for substantially closing the gaps between the free ends of the stacks and the underfoot structure.

8. A bookstack comprising in combination a pair of spaced shelf supports at each end of the stack, a plurality of shelves and means adjacent edges of said supports engageable by the shelves for supporting them, said supports being adjustable to support shelves of certain different widths by altering the spacing thereof and of another width by transposing the supports of the pairs of supports.

9. A bookstack comprising in combination with upright and horizontal structural building members, shelf supports suspended from said horizontal members and adjacent said upright members, means carried by the supports and by said upright structural members for support of the shelves, and means carried by the suspended supports at their lower portions and engaging said upright structural members for supporting the bookstack against swaying.

In testimony whereof I have hereunto signed my name.

ANGUS S. MACDONALD.